US010738707B2

(12) United States Patent
Bennett et al.

(10) Patent No.: US 10,738,707 B2
(45) Date of Patent: Aug. 11, 2020

(54) IGNITER FOR A GAS TURBINE ENGINE

(71) Applicant: General Electric Company, Schenectady, NY (US)

(72) Inventors: William Thomas Bennett, Cincinnati, OH (US); Kevin Samuel Klasing, Springboro, OH (US); Craig Alan Gonyou, Blanchester, OH (US)

(73) Assignee: General Electric Company, Schenectady, NY (US)

( * ) Notice: Subject to any disclaimer, the term of this patent is extended or adjusted under 35 U.S.C. 154(b) by 601 days.

(21) Appl. No.: 14/935,758

(22) Filed: Nov. 9, 2015

(65) Prior Publication Data

US 2017/0130653 A1    May 11, 2017

(51) Int. Cl.
*F02C 7/264* (2006.01)
*F23R 3/34* (2006.01)
*F23Q 3/00* (2006.01)

(52) U.S. Cl.
CPC .............. *F02C 7/264* (2013.01); *F23Q 3/008* (2013.01); *F23R 3/343* (2013.01); *F05D 2260/99* (2013.01)

(58) Field of Classification Search
CPC .. F23R 2900/00012; F23R 2900/03043; F23R 3/60; F02C 7/264; F02C 7/266; F02C 7/12; F02C 7/18; F02C 7/20
See application file for complete search history.

(56) References Cited

U.S. PATENT DOCUMENTS

| | | | |
|---|---|---|---|
| 3,024,607 A | 3/1962 | Washburn | |
| 3,736,748 A | 6/1973 | Walker et al. | |
| 3,990,834 A * | 11/1976 | DuBell | F02C 7/18 431/263 |
| 4,768,477 A | 9/1988 | Richardson | |
| 6,920,762 B2 | 7/2005 | Wells et al. | |
| 7,216,488 B2 | 5/2007 | Howell et al. | |
| 8,046,987 B2 | 11/2011 | Wilmot et al. | |
| 8,181,440 B2 | 5/2012 | Sandelis | |
| 8,479,490 B2 | 7/2013 | Zupanc et al. | |
| 8,726,631 B2 | 5/2014 | Rudrapatna et al. | |
| 2006/0180111 A1 | 8/2006 | Fleetwood | |
| 2014/0144148 A1 | 5/2014 | Jause et al. | |

FOREIGN PATENT DOCUMENTS

EP    0386028 A1    9/1990

OTHER PUBLICATIONS

European Search Report and Written Opinion issued in connection with corresponding European Application No. 16197343.3 dated Mar. 17, 2017.

* cited by examiner

*Primary Examiner* — Steven M Sutherland
(74) *Attorney, Agent, or Firm* — Dority & Manning, P.A.

(57) ABSTRACT

A gas turbine engine includes a combustion section space between a compressor section in a turbine section. The combustion section defines a combustion chamber and includes a combustor member defining an opening to the combustion chamber. A mounting assembly extends around or is positioned adjacent to the opening defined by the combustor member. In igniter extends through a ferrule of the mounting assembly and includes a distal end positioned proximate the opening in the combustor member. The igniter defines a plurality of channels each channel extending between a first end and a second end. The first end is positioned away from the distal end of the igniter relative to the second end, and the second end is a terminal end spaced from the distal end of the igniter.

1 Claim, 5 Drawing Sheets

IGNITER FOR A GAS TURBINE ENGINE

FIELD OF THE INVENTION

The present subject matter relates generally to an igniter for a combustor of a gas turbine engine.

BACKGROUND OF THE INVENTION

A gas turbine engine generally includes a core, and the core of the gas turbine engine generally includes, in serial flow order, a compressor section, a combustion section, a turbine section, and an exhaust section. A flow of compressed air is provided from the compressor section to the combustion section, wherein the compressed air is mixed with fuel and ignited to generate combustion gases. The combustion gases flow through the turbine section, driving the core. An igniter is provided within the combustion section, attached to a casing within the combustion section and extending to or through, e.g., a combustion liner at least partially defining a combustion chamber. Certain gas turbine engines utilize nontraditional high temperature materials, such as ceramic matrix composite (CMC) materials for the combustion liner. Such CMC materials may generally be better capable of withstanding the extreme temperatures within the combustion chamber. However, such CMC materials define different coefficients of thermal expansion than other metal components (such as the casing within the combustion section).

Accordingly, the igniter may be movably attached to the combustion liner using a mounting assembly. The mounting assembly may allow for movement of the igniter relative to the combustion liner. However, such mounting assemblies typically leave a void surrounding an end of the igniter to provide sufficient room for the igniter to move relative to the combustion liner. Such voids may be susceptible to ingestion of the combustion gases within the combustion chamber, potentially elevating a temperature of the components exposed to such congested combustion gases past a safe operating level.

Thus, an igniter capable of minimizing such ingestion of combustion gasses in the void surrounding the tip of the igniter would be useful. More particularly, an igniter capable of minimizing such ingestion of combustion gasses in the void surrounding the tip of the igniter, while also maintaining a temperature of the tip of the igniter below a desired threshold would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a compressor section, a turbine section located downstream of the compressor section, and a combustion section disposed between the compressor section and the turbine section. The combustion section defines a combustion chamber and includes a combustor member defining an opening to the combustor chamber. The combustion section additionally includes a mounting assembly extending around or positioned adjacent to the opening defined by the combustor member. The mounting assembly includes a ferrule. The combustion section further includes an igniter extending through the ferrule and including a distal end positioned proximate the opening in the combustor member. The igniter defines a plurality of channels, each channel extending between a first end and a second end, the first end positioned away from the distal end of the igniter relative to the second end, and the second end being a terminal end spaced from the distal end of the igniter.

In another exemplary embodiment of the present disclosure, an igniter for a combustion section of a gas turbine engine is provided. The combustion section includes a combustor defining an opening and a mounting assembly extending around or adjacent to the opening defined by the combustor liner. The mounting assembly includes a ferrule. The igniter includes a tip having a distal end of the igniter. The tip is configured to extend through the ferrule and at least partially into the opening in the combustor liner when the igniter is installed in the combustion assembly. The tip defines an exterior surface, and the exterior surface defines a plurality of channels. Each channel extends between a first end and a second end, the first end positioned away from the distal end of the igniter relative to the second end, and the second end spaced from the distal end of the igniter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
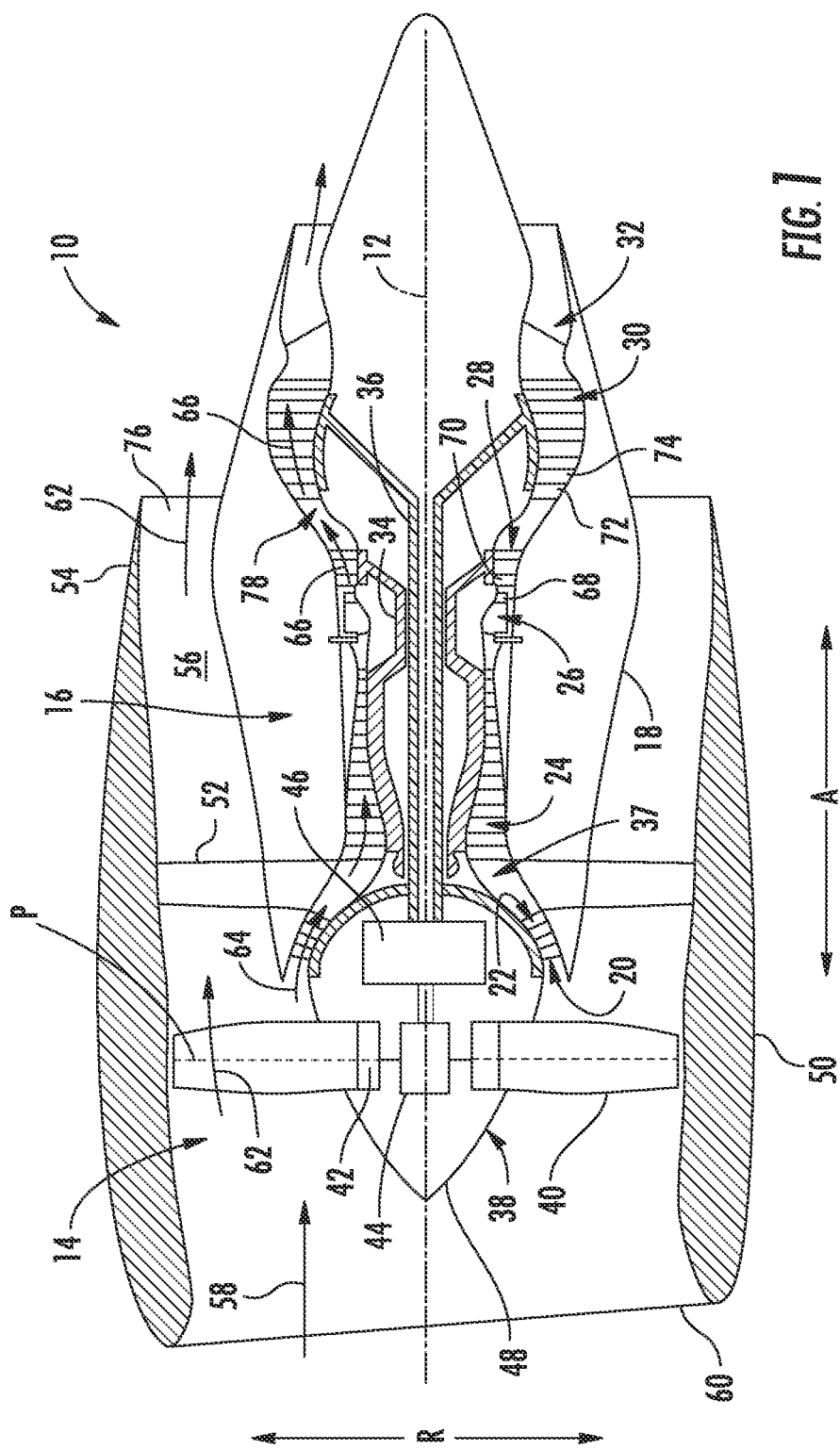
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc.

Figure 2:
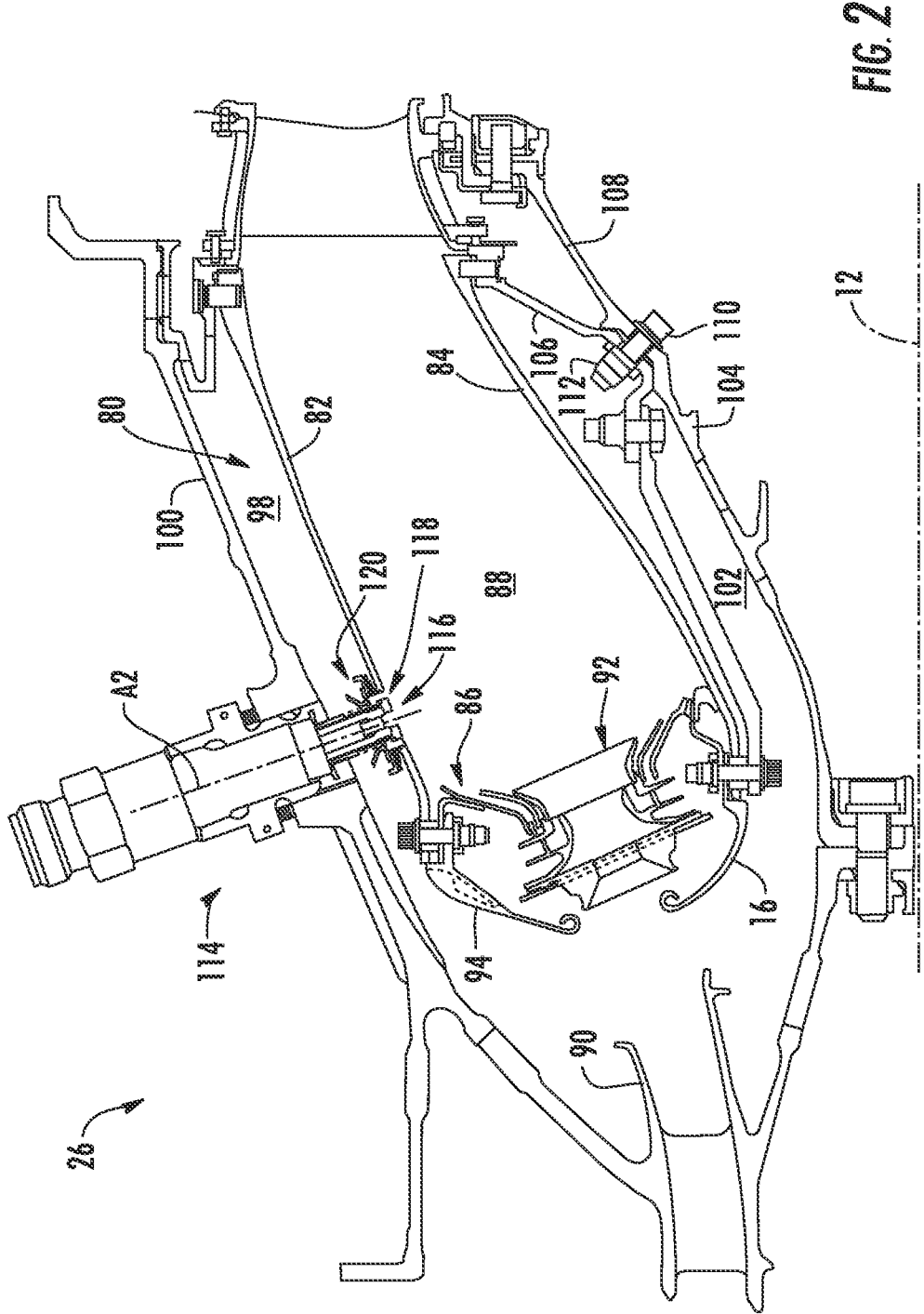
FIG. 2 is a schematic, cross-sectional view of a combustion section of the exemplary gas turbine engine of FIG. 1.

Referring now to FIG. 2, a schematic, cross-sectional view of the combustion section 26 of the exemplary turbofan engine 10 of FIG. 1 is provided. The combustion section 26 generally includes a combustor 80 that generates the combustion gases discharged into the turbine section, or more particularly, into the HP turbine 28.

As is depicted, the combustor 80 includes an outer liner 82, an inner liner 84, and a dome 86—the outer liner 82, inner liner 84, and dome 86 together defining a combustion chamber 88. Additionally, a diffuser 90 is positioned upstream of the combustion chamber 88. The diffuser 90 receives an airflow from the compressor section and provides such flow of compressed air to the combustor 80. More particularly, for the embodiment depicted the diffuser 90 provides the flow of compressed air to a single circumferential row of fuel/air mixers 92. Accordingly, the exemplary combustor dome 86 depicted is configured as a single annular dome, and the circumferential row of fuel/air mixers 92 are provided within openings formed in such dome 86. However, in other embodiments, a multiple annular dome may be utilized.

A fuel nozzle (not shown) provides fuel to fuel/air mixers 92 in accordance with a desired performance of the combustor 80 at various engine operating states. It will also be noted that for the embodiment depicted, an outer annular cowl 94 and an inner annular cowl 96 are located upstream of the combustion chamber 88 so as to direct air flow into fuel/air mixers 92. The outer and inner annular cowls 94, 96 may also direct a portion of the flow of air from the diffuser 90 to an outer passage 98 defined between the outer liner 82 and an outer casing 100 and an inner passage 102 defined between the inner liner 84 and an inner casing 104. Additionally for the embodiment depicted, an inner support cone 106 is further shown as being connected to a nozzle support 108 by means of a plurality of bolts 110 and nuts 112. However, other exemplary combustion sections may include any other suitable structural configuration.

It will be appreciated that certain components of the combustor 80, such as the outer and inner liner 82, 84, may be formed of a Ceramic Matrix Composite (CMC), which is a non-metallic material having high temperature capability. Exemplary composite materials utilized for such liners include silicon carbide, silicon, silica or alumina matrix materials and combinations thereof. Typically, ceramic fibers are embedded within the matrix such as oxidation stable reinforcing fibers including monofilaments like sapphire and silicon carbide, as well as rovings and yarn including silicon carbide, alumina silicates, and chopped whiskers and fibers, and optionally ceramic particles (e.g., oxides of Si, Al, Zr, Y and combinations thereof) and inorganic fillers (e.g., pyrophyllite, wollastonite, mica, talc, kyanite and montmorillonite). CMC materials may have coefficients of thermal expansion in the range of about 1.3×10–6 in/in/° F. to about 3.5×10–6 in/in/° F. in a temperature range of approximately 1000-1200° F.

By contrast, other components of the combustor 80/combustion section 26, such as the outer casing 30, inner casing 31 and other support members of the combustion section 26, may be formed of a metal, such as a nickel-based superalloy (which may have a coefficient of thermal expansion of about 8.3-8.6×10–6 in/in/° F. in a temperature range of approximately 1000-1200° F.) or cobalt-based superalloy (which may have a coefficient of thermal expansion of about 9.2-9.4×10–6 in/in/° F.). Thus, although outer and inner liners 82, 84 may be better able to handle the extreme temperature environment presented in combustion chamber 88, such components may expand differently from the metal components of the combustion section due to the mismatched coefficients of thermal expansion.

Referring still to FIG. 2, an igniter 114 is provided so as to ignite the fuel/air mixture supplied to combustion chamber 88. The exemplary igniter 114 depicted is attached to the outer casing 100 of the combustor 80 in a substantially fixed manner. Additionally, the igniter 114 extends generally along an axial direction $A_2$, defining a distal end 116 that is positioned proximate to an opening in a combustor member of the combustion chamber 88. More particularly, for the embodiment depicted, the distal end 116 is positioned proximate to an opening 118 defined by the outer liner 82 of the combustor 80 to the combustion chamber 88. Notably, given the differing materials forming the outer liner 82 of the combustor 80 and the outer casing 100 of the combustor 80, the distal end 116 of the igniter 114 may need to be movable relative to the outer liner 82 of the combustor 80. Accordingly, a mounting assembly 120 is provided to mount the igniter 114 to the outer liner 82 of the combustor 80.

Figure 3:
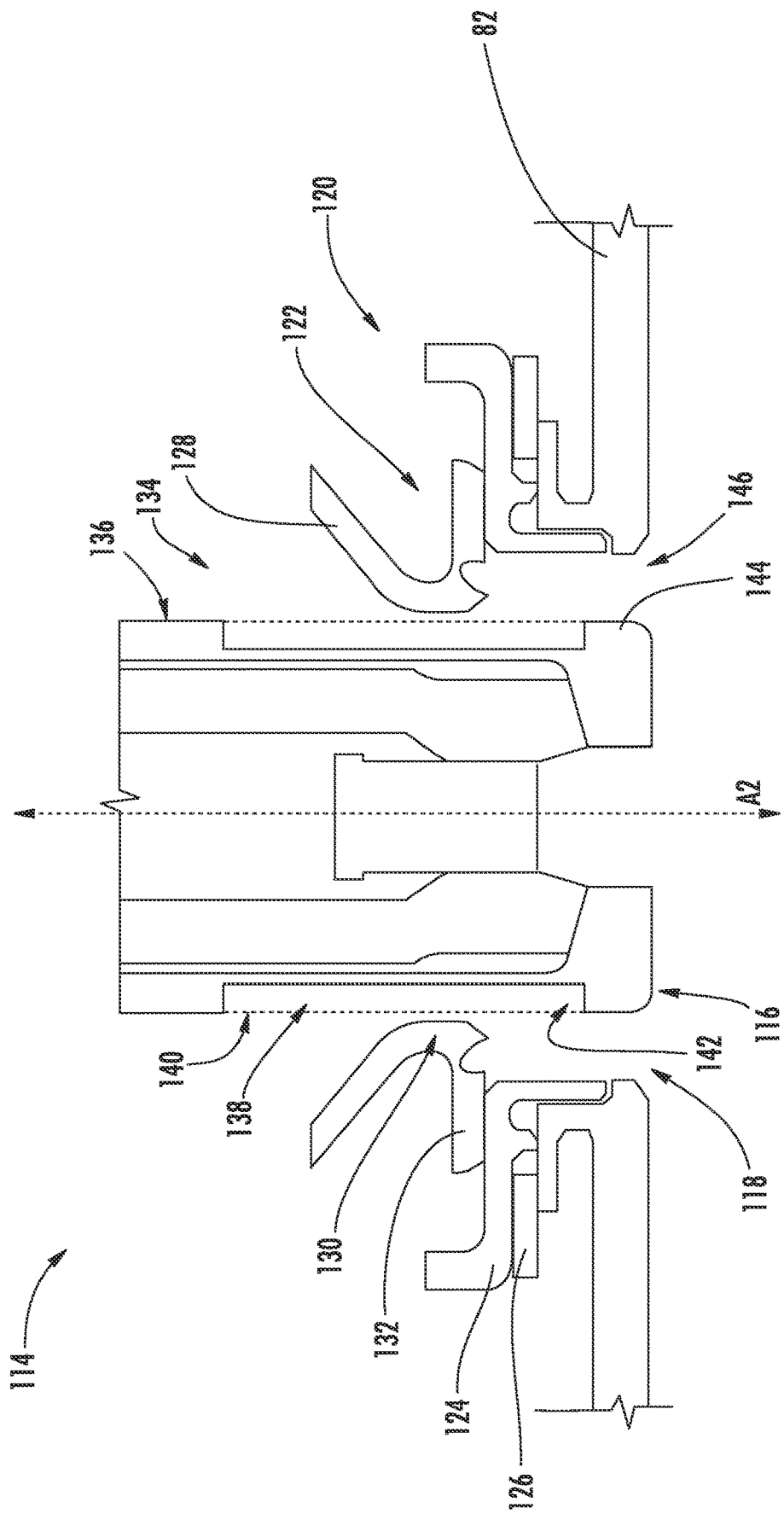
FIG. 3 is a close-up, schematic, cross-sectional view of an end of an igniter of the exemplary combustion section of FIG. 2.

Referring now also to FIG. 3, a close-up, cross-sectional view is provided of the exemplary igniter 114, mounting assembly 120, and outer liner 82 of the combustor 80 depicted in FIG. 2. As shown, the exemplary mounting assembly 120 extends around or is positioned adjacent to the opening 118 defined by the outer liner 82. The mounting assembly 120 generally includes a ferrule 122, a cap 124, and an impingement baffle 126. The exemplary ferrule 122 depicted generally includes an outer flared portion 128; a contact portion 130 extending around/surrounding the igniter 114 and contacting, or being positioned directly adjacent to, the igniter 114; and an attachment portion 132 attached to the cap 124. The attachment portion 132 of the ferrule 122 may be movably attached to the cap 124, and the cap 124 may, in turn, be fixedly attached around the opening 118 defined by the outer liner 82. Accordingly, the cap 124 and ferrule 122 configuration may allow for movement of the igniter 114 relative to the outer liner 82 in a direction parallel to a direction in which the outer liner 82 extends.

Additionally, for the embodiment depicted, the igniter 114 extends through the ferrule 122 such that the distal end 116 is positioned proximate to the opening 118 defined by the outer liner 82 of the combustor 80. As used herein, "positioned proximate to the opening 118" refers to the distal end 116 of the igniter 114 extending through the opening 118 defined by the outer liner 82, positioned in the opening 118 defined by the outer liner 82, or positioned slightly outward of the opening 118 defined by the outer liner 82 relative to the combustion chamber 88. Notably, a position of the distal end 116 proximate to the opening 118 defined by the outer liner 82 may vary at least in part due to a relative thermal expansion of the outer liner 82 and/or the outer casing 100. Accordingly, the mounting assembly 120 may thus accommodate the varying position of the distal end 116 of the igniter 114. More specifically, the igniter 114 may be slidably received through the ferrule 122 such that the igniter 114 may also move relative to the outer liner 82 in a direction perpendicular to the direction which the outer liner 82 extends.

Figure 4:
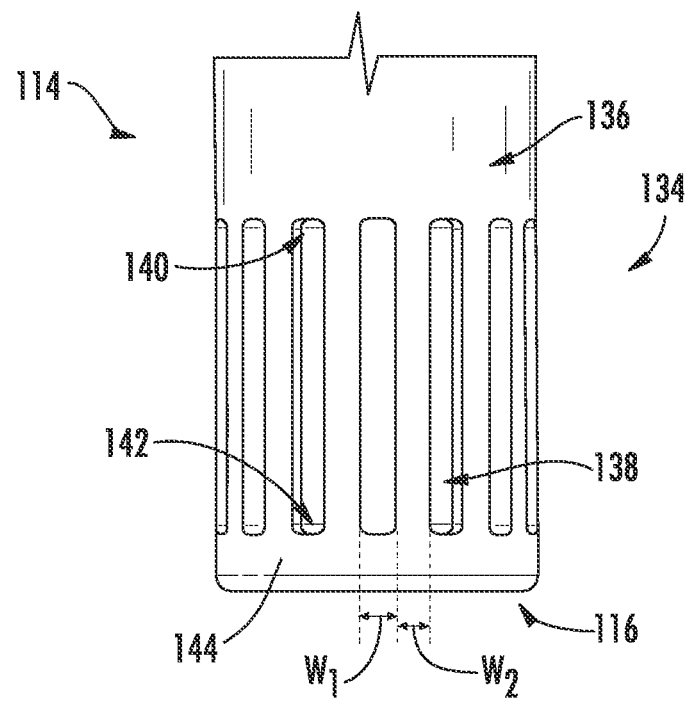
FIG. 4 is a close-up, side view of the igniter of the exemplary combustion section FIG. 2.

Referring now also to FIG. 4, providing a side view of a portion of the igniter 114, the igniter 114 generally includes a tip 134, the tip 134 being a portion of the igniter 114 having the distal end 116 and extending through the ferrule 122 when the igniter 114 is installed in the combustion section 26. The tip 134 generally includes an exterior or outside surface 136 with a plurality of grooves or channels 138 defined therein. Each channel 138 extends generally between a first end 140 and a second end 142. The first end 140 is positioned away from the distal end 116 of the igniter 114 relative to the second end 142, and the second end 142 is configured as a terminal end spaced from the distal end 116 of the igniter 114 (such that the channel 138 terminates prior to reaching the distal end 116 of the igniter 114). Accordingly, for the embodiment depicted, each channel 138 extends generally from the first end 140 to the second end 142 towards the distal end 116 of the igniter 114. More particularly, for the embodiment depicted, each of the plurality of channels 138 extend generally along the axial direction $A_2$ of the igniter 114 towards the distal end 116 of the igniter 114, and are spaced evenly generally along a circumferential direction C (see FIG. 5) of the igniter 114.

Each of the plurality of channels 138 defines a channel width $W_1$, and the igniter 114 additionally defines a spacing width $W_2$. The channel width $W_1$ is defined as a width of the channel 138 generally along the circumferential direction C of the igniter 114, and the spacing width $W_2$ is defined as a distance along the circumferential direction C between adjacent channels 138. For the embodiment depicted, each of the plurality of channels 138 may define a channel width $W_1$ between about 0.02 inches and about 0.2 inches. For example, in certain exemplary embodiments, each of the plurality of channels 138 may define a channel width $W_1$ between about 0.025 inches and about 0.15 inches, or between about 0.03 inches and about 0.1 inches. Moreover, for the embodiment depicted, the spacing width $W_2$ between each adjacent channel 138 may be substantially the same as the channel width $W_1$. However, in other exemplary embodiments, the spacing width $W_2$ may be greater than or less than the channel width $W_1$.

Referring still to the figures, and as previously stated, the second end 142 of each channel 138 is a terminal end spaced from the distal end 116 of the igniter 114. Accordingly, the igniter 114 further includes an agitation portion 144 located between the second ends 142 of each of the channels 138 and the distal end 116 of the igniter 114. As will be described in greater detail below, the agitation portion 144 is configured to disrupt a flow of air through each of the plurality of channels 138 prior to such flow of air reaching the distal end 116 of the igniter 114. Moreover, for the embodiment depicted, the agitation portion 144 extends around a circumference of the igniter 114 between the second ends 142 of each of the plurality of channels 138 and the distal end 116 of the igniter 114. The agitation portion 144 of the igniter 114 may define a dimension along the axial direction $A_2$ of the igniter 114 of at least about 0.02 inches. For example, the agitation portion 144 of the igniter 114 may define a dimension along the axial direction $A_2$ of the igniter 114 between about 0.02 inches and about 0.2 inches, between about 0.025 inches and about 0.15 inches, or between about 0.03 inches and about 0.1 inches.

Figure 5:
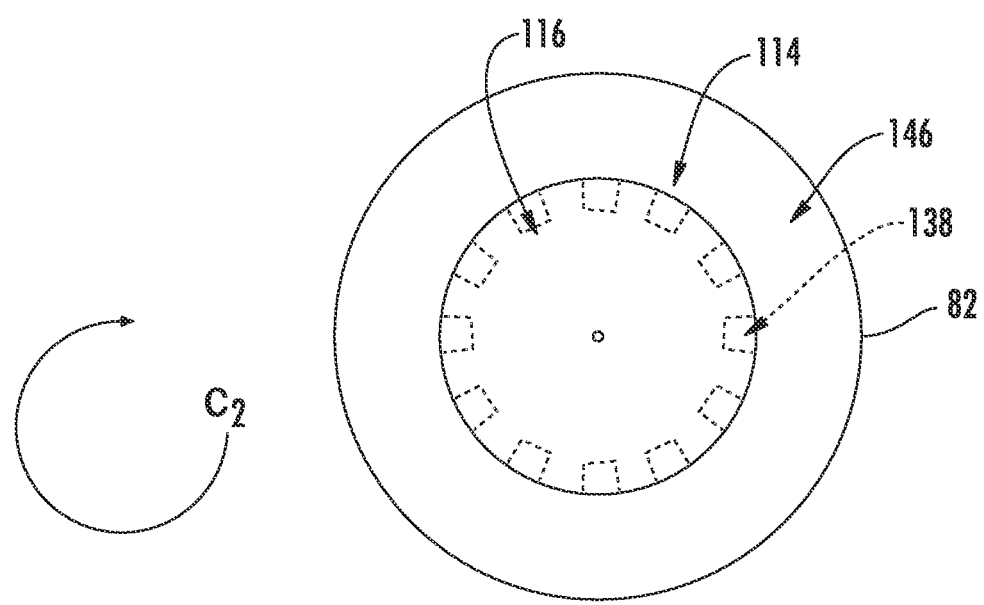
FIG. 5 is a close-up, schematic, end view of the igniter of the exemplary combustion section FIG. 2.

Notably, referring now also briefly to FIG. 5, providing a schematic, end view of the igniter 114 proximate the opening 118 in the outer casing 82, the igniter 114 defines an annular gap 146 with the outer liner 82 of the combustor 80 around the distal end 116 of the igniter 114. As shown, the annular gap 146 extends along the circumferential direction C around the distal end 116 of the igniter 114. The annular gap 146 may allow for an anticipated amount of movement of the igniter 114 relative to the outer liner 82 of the combustor 80 during operation of the turbofan engine 10 due to, e.g., mismatched thermal expansions.

Figure 6:
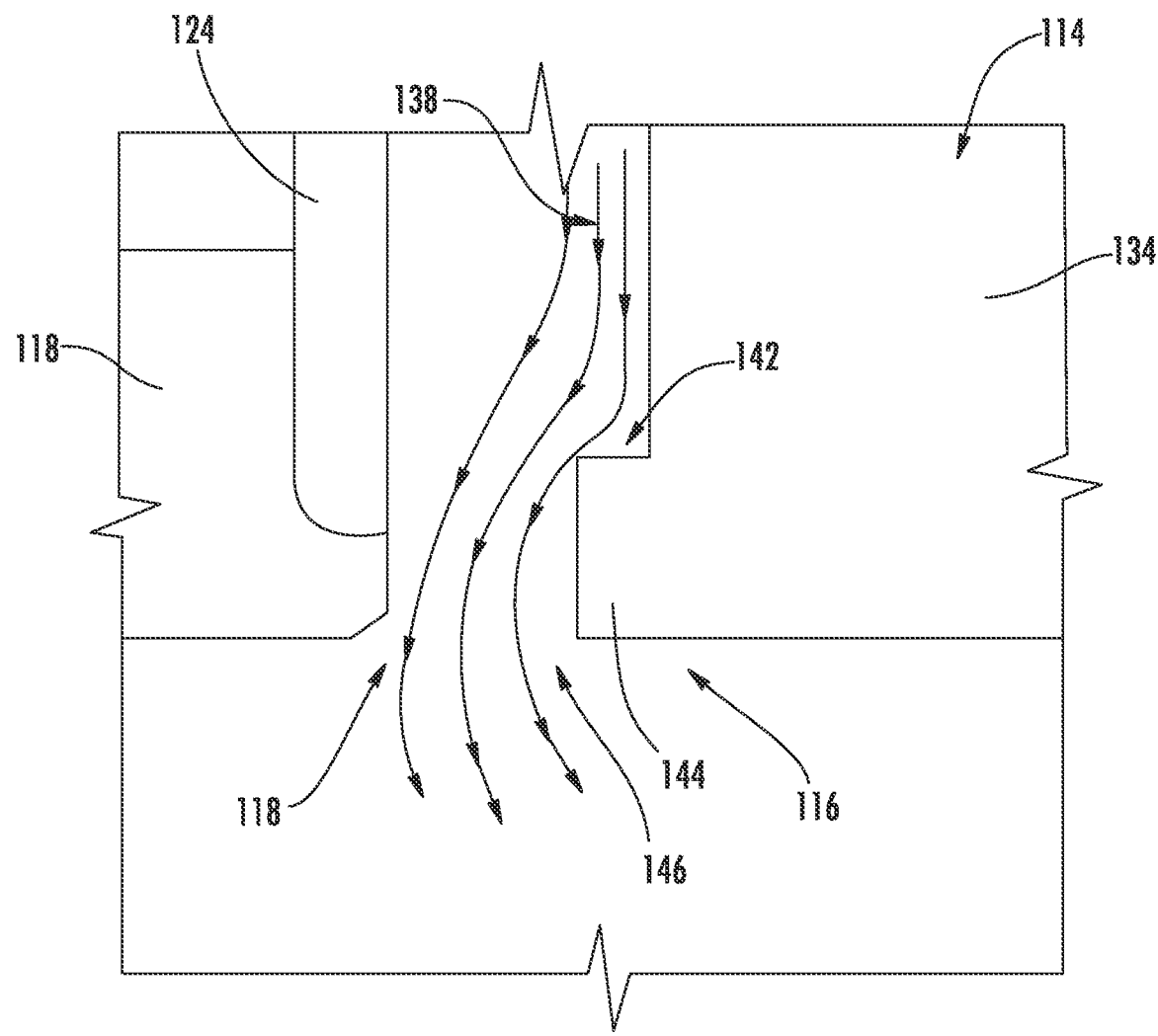
FIG. 6 is a close-up, schematic, cross-sectional view of a channel of the igniter of the exemplary combustion section of FIG. 2, depicting a flow of air therethrough.

Moreover, referring back to FIGS. 3 and 4, for the embodiment depicted, the first ends 140 of the plurality of channels 138 are positioned outward of the ferrule 122 relative to the outer liner 82 of the combustor 80, or more specifically, outward of the contact portion 130 of the ferrule 122 relative to the outer liner 82 and combustion chamber 88. During operation, the plurality of channels 138 operate to maintain the igniter 114 within a safe operating temperature. Further, referring now also to FIG. 6, providing a close-up, cross-sectional view of a flow of air through one of the plurality of channels 138 defined in the outside surface 136 of the tip 134 of the igniter 114, the plurality of channels 138 also operate to maintain components proximate the distal end 116 of the igniter 114 within a safe operating temperature. The channels 138 of the exemplary igniter 114 receive a flow of cooling air at the first end 140 from, e.g., the outer passage 98, and provide such flow of cooling air through the respective channels 138 to the second end 142. The positioning of the contact portion 130 of the ferrule 122 adjacent to the outside surface 136 of the igniter 114 between the first and second ends 140, 142 of the channels 138 ensures the flow of air is directed through the channels 138. As is depicted in FIG. 6, upon reaching the second ends 142 of the respective channels 138, the flow of cooling air is disrupted by the agitation portion 144 of the igniter 114, creating a turbulent flow extending radially outward from the igniter 114 into the annular gap 146 defined by the igniter 114 with the outer combustor liner 82. The disrupted flow of cooling air operates to prevent or minimize an ingestion of hot combustion gases from the combustion chamber 88 into the annular gap 146 defined by the igniter 114 with the outer combustor liner 82. More particularly, the disrupted flow extends outwardly into the annular gap 146 such that there is no, or a minimum amount of, room for any combustion gases to be ingested.

Accordingly, a gas turbine engine having an igniter defining a plurality of channels in accordance with one or more embodiments of the present disclosure may reduce a temperature of, e.g., a mounting assembly attaching the igniter to an outer combustor liner, as well as the outer combustor liner itself, by preventing or minimizing an amount of combustion gasses ingested into an annular gap defined by the igniter and adjacent components.

It should be appreciated, however, that the exemplary embodiment depicted in FIGS. 2 through 6 is provided by way of example only. In other exemplary embodiments, the turbofan engine 10, and specifically the igniter 114 may have any other suitable configuration. For example, in other exemplary embodiments, the outer liner 82 may be formed of any suitable material, such as a suitable metal material. Additionally in other exemplary embodiments, the plurality of channels 138 may not extend generally along the axial direction $A_2$ of the igniter 114, and instead may extend in any other suitable direction. For example, in other exemplary embodiments, one or more of the plurality of channels 138 may define a generally helical shape extending around the outside surface 136 of the igniter 114. Additionally, or alternatively, one or more of the plurality of channels 138 may still extend linearly, however such channels may define an angle relative to the axial direction $A_2$ of the igniter 114. Moreover, although for the embodiment depicted, the plurality of channels 138 are substantially evenly spaced along the circumferential direction of the igniter 114, in other exemplary embodiments, the plurality channels 138 may instead define any other suitable non-even spacing. For example, in other exemplary embodiments, the plurality of channels 138 may be spaced closer to one another along a side of the igniter 114 positioned in the upstream portion of the combustor 80.

Further, it should be appreciated, that although the igniter 114 is depicted having a distal end 116 position proximate to the opening 118 and the outer liner 82, the combustion section may instead be configured such that the distal end 116 of the igniter 114 extends through any other suitable combustion member defining an opening to the combustion chamber 88. For example, the combustion section 26 may include one or more structural members positioned inward of the outer liner 82, with the distal end 116 of the igniter 114 position proximate to such opening.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising: a compressor section; a turbine section located downstream of the compressor section; and a combustion section disposed between the compressor section and the turbine section, the combustion section defining a combustion chamber and comprising a combustor member defining an opening to the combustor chamber; a mounting assembly extending around or positioned adjacent to the opening defined by the combustor member, the mounting assembly comprising a ferrule; and an igniter extending through the ferrule and including a distal end positioned proximate the opening in the combustor member, the igniter defining a plurality of channels, each channel extending between a first end and a second end, the first end positioned away from the distal end of the igniter relative to the second end, and the second end being a terminal end spaced from the distal end of the igniter, wherein the ferrule includes a contact portion that contacts the igniter, and wherein the first ends of the plurality of channels are positioned outward from the contact portion of the ferrule relative to the combustor member.

* * * * *